US012689077B2

(12) United States Patent (10) Patent No.: US 12,689,077 B2

Jeong (45) Date of Patent: Jul. 21, 2026

(54) BATTERY PACK AND DEVICE INCLUDING THE SAME

(71) Applicant: LG ENERGY SOLUTION, LTD., Seoul (KR)

(72) Inventor: Jee Hoon Jeong, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 496 days.

(21) Appl. No.: 18/029,533

(22) PCT Filed: Nov. 4, 2021

(86) PCT No.: PCT/KR2021/015907

§ 371 (c)(1),
(2) Date: Mar. 30, 2023

(87) PCT Pub. No.: WO2022/119154

PCT Pub. Date: Jun. 9, 2022

(65) Prior Publication Data

US 2023/0369673 A1 Nov. 16, 2023

(30) Foreign Application Priority Data

Dec. 3, 2020 (KR) ........................ 10-2020-0167414

(51) Int. Cl.
*H01M 10/647* (2014.01)
*H01M 10/613* (2014.01)
(Continued)

(52) U.S. Cl.
CPC ....... *H01M 10/647* (2015.04); *H01M 10/613* (2015.04); *H01M 10/653* (2015.04);
(Continued)

(58) Field of Classification Search
None
See application file for complete search history.

(56) References Cited

U.S. PATENT DOCUMENTS

2016/0141735 A1* 5/2016 Motohashi ........ H01M 10/6554
429/120
2016/0164149 A1* 6/2016 Hodge ................ H01M 50/103
429/120
(Continued)

FOREIGN PATENT DOCUMENTS

JP 2009-301877 A 12/2009
JP 2016-213104 A 12/2016
(Continued)

OTHER PUBLICATIONS

International Search Report for PCT/KR2021/015907 (PCT/ISA/210) mailed on Mar. 3, 2022.

*Primary Examiner* — Scott J. Chmielecki

(74) *Attorney, Agent, or Firm* — Birch, Stewart, Kolasch & Birch, LLP

(57) ABSTRACT

A battery pack includes a pack housing to which a plurality of battery modules are mounted; a heat transfer member positioned on the pack housing; and a cooling member positioned in the lower part of the pack housing, wherein the battery module comprises a battery cell stack in which a plurality of battery cells are stacked, and the lower surface of the battery module is opened, and wherein the lower surface of the battery cell stack and the heat transfer member come into contact with each other.

16 Claims, 4 Drawing Sheets

(51) Int. Cl.

| | | |
|---|---|---|
| *H01M 10/653* | (2014.01) | |
| *H01M 10/6551* | (2014.01) | |
| *H01M 10/6554* | (2014.01) | |
| *H01M 50/211* | (2021.01) | |

(52) U.S. Cl.

CPC ... *H01M 10/6551* (2015.04); *H01M 10/6554* (2015.04); *H01M 50/211* (2021.01)

(56) References Cited

U.S. PATENT DOCUMENTS

| | | | | |
|---|---|---|---|---|
| 2018/0034117 A1* | 2/2018 | Bang | ................. | H01M 10/6554 |
| 2020/0067038 A1* | 2/2020 | Chi | ..................... | H01M 50/211 |
| 2020/0259137 A1 | 8/2020 | Yao et al. | | |
| 2021/0203020 A1* | 7/2021 | Ahn | ..................... | H01M 10/64 |
| 2021/0296728 A1 | 9/2021 | Kim et al. | | |
| 2021/0328284 A1* | 10/2021 | Kim | ................... | H01M 10/625 |
| 2021/0351455 A1 | 11/2021 | Kim et al. | | |

| | | | | |
|---|---|---|---|---|
| 2022/0037726 A1* | 2/2022 | Choi | .................... | H01M 50/211 |
| 2022/0173452 A1* | 6/2022 | Howe | ................ | H01M 10/625 |
| 2022/0393283 A1* | 12/2022 | Choi | .................... | H01M 50/211 |
| 2022/0416312 A1* | 12/2022 | Zeiler | ................ | H01M 10/425 |
| 2022/0416343 A1* | 12/2022 | He | ..................... | H01M 10/613 |
| 2022/0416346 A1* | 12/2022 | He | ..................... | H01M 50/209 |

FOREIGN PATENT DOCUMENTS

| | | | |
|---|---|---|---|
| JP | 6130916 | B2 | 5/2017 |
| JP | 2018-41585 | A | 3/2018 |
| JP | 6617583 | B2 | 12/2019 |
| KR | 10-1661972 | B1 | 10/2016 |
| KR | 10-2018-0119990 | A | 11/2018 |
| KR | 10-2020-0015207 | A | 2/2020 |
| KR | 10-2020-0033776 | A | 3/2020 |
| KR | 10-2020-0077296 | A | 6/2020 |
| KR | 10-2020-0085616 | A | 7/2020 |
| KR | 10-2020-0086907 | A | 7/2020 |

\* cited by examiner

【FIG. 1】
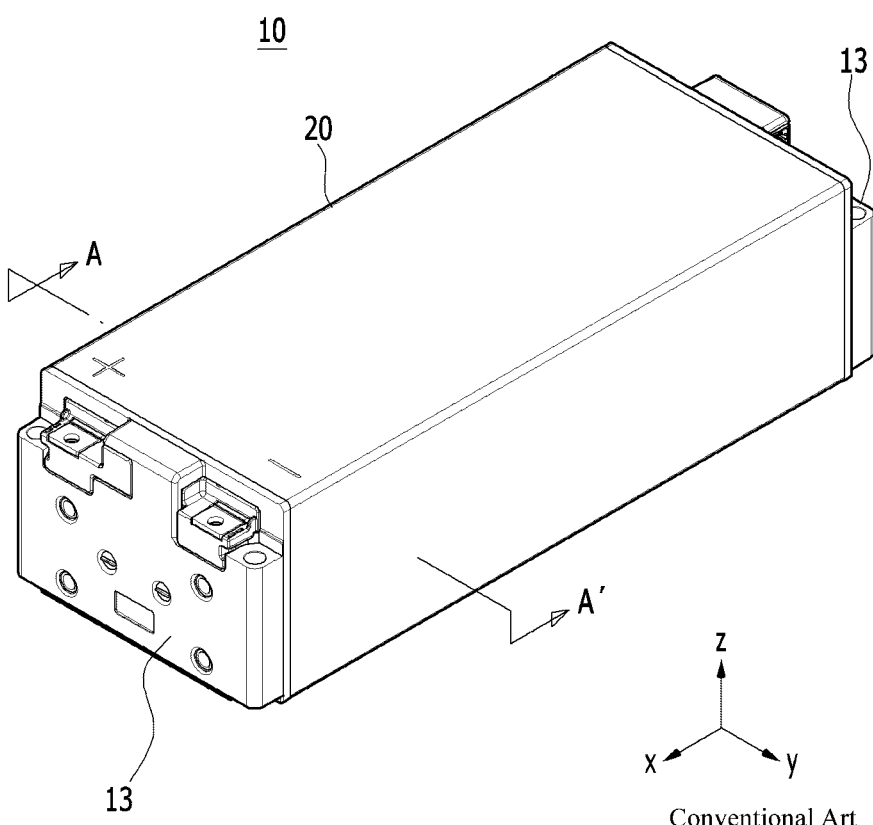
Conventional Art

【FIG. 2】
10
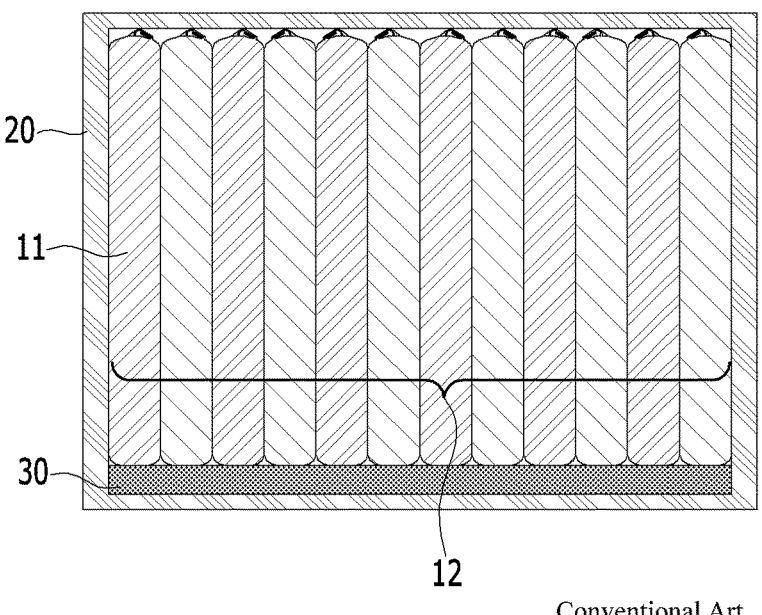
Conventional Art
【FIG. 3】
10
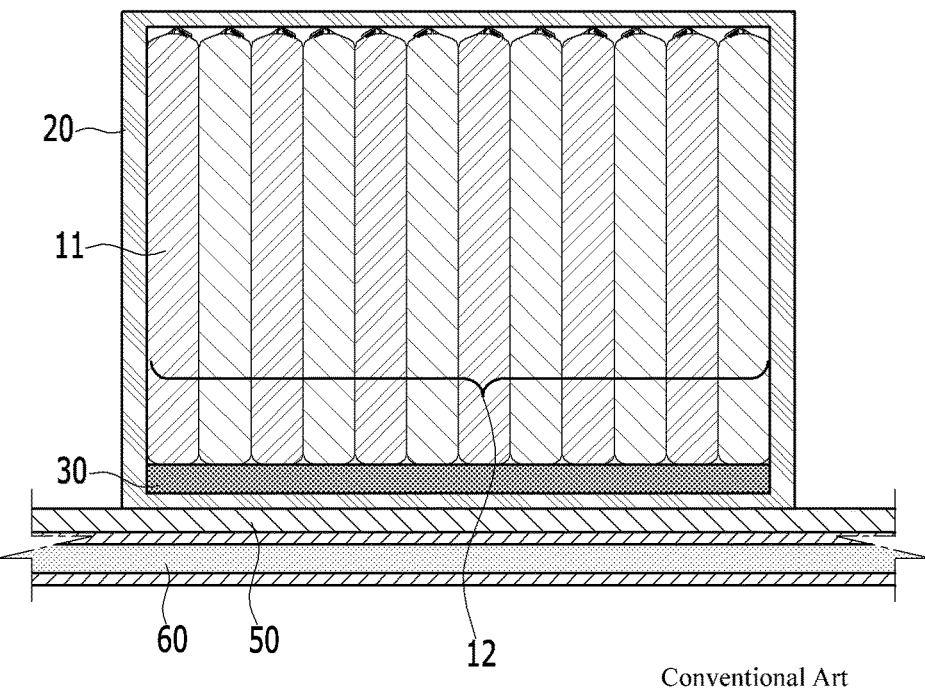
Conventional Art

【FIG. 4】
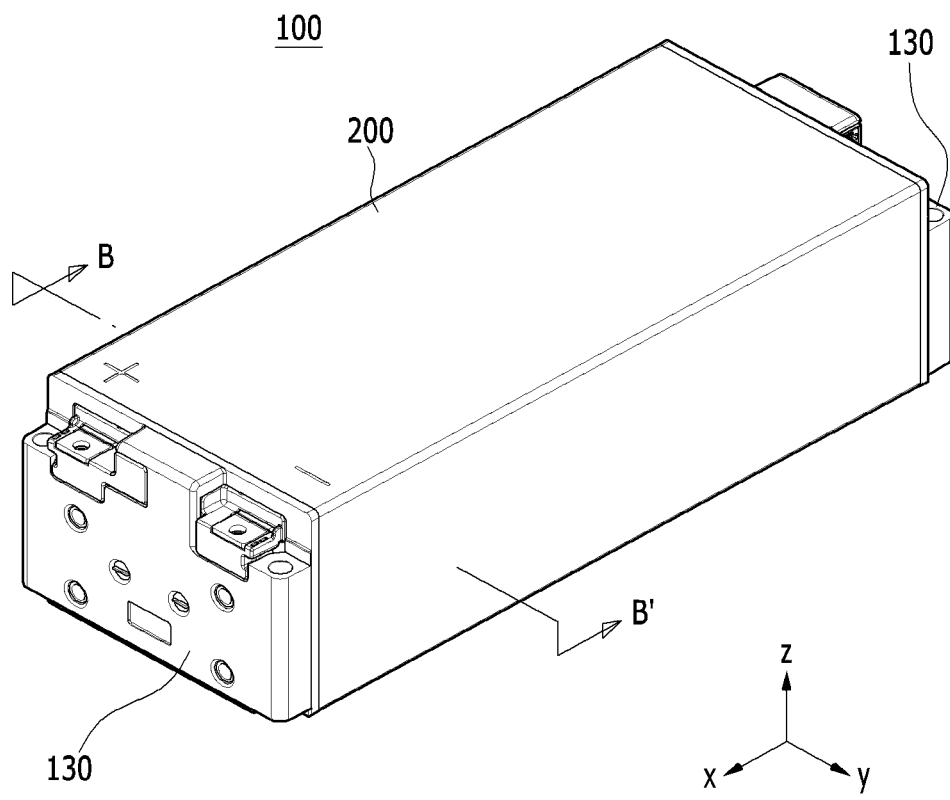
【FIG. 5】
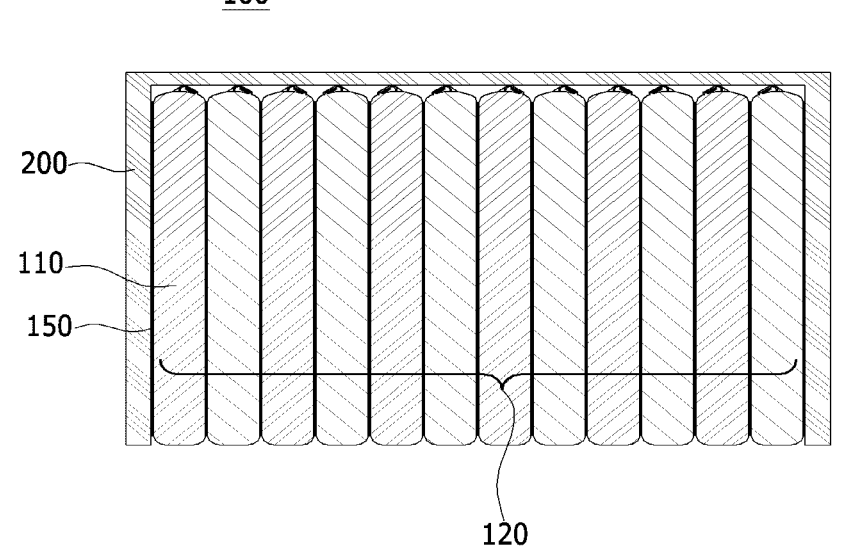

[FIG. 6]
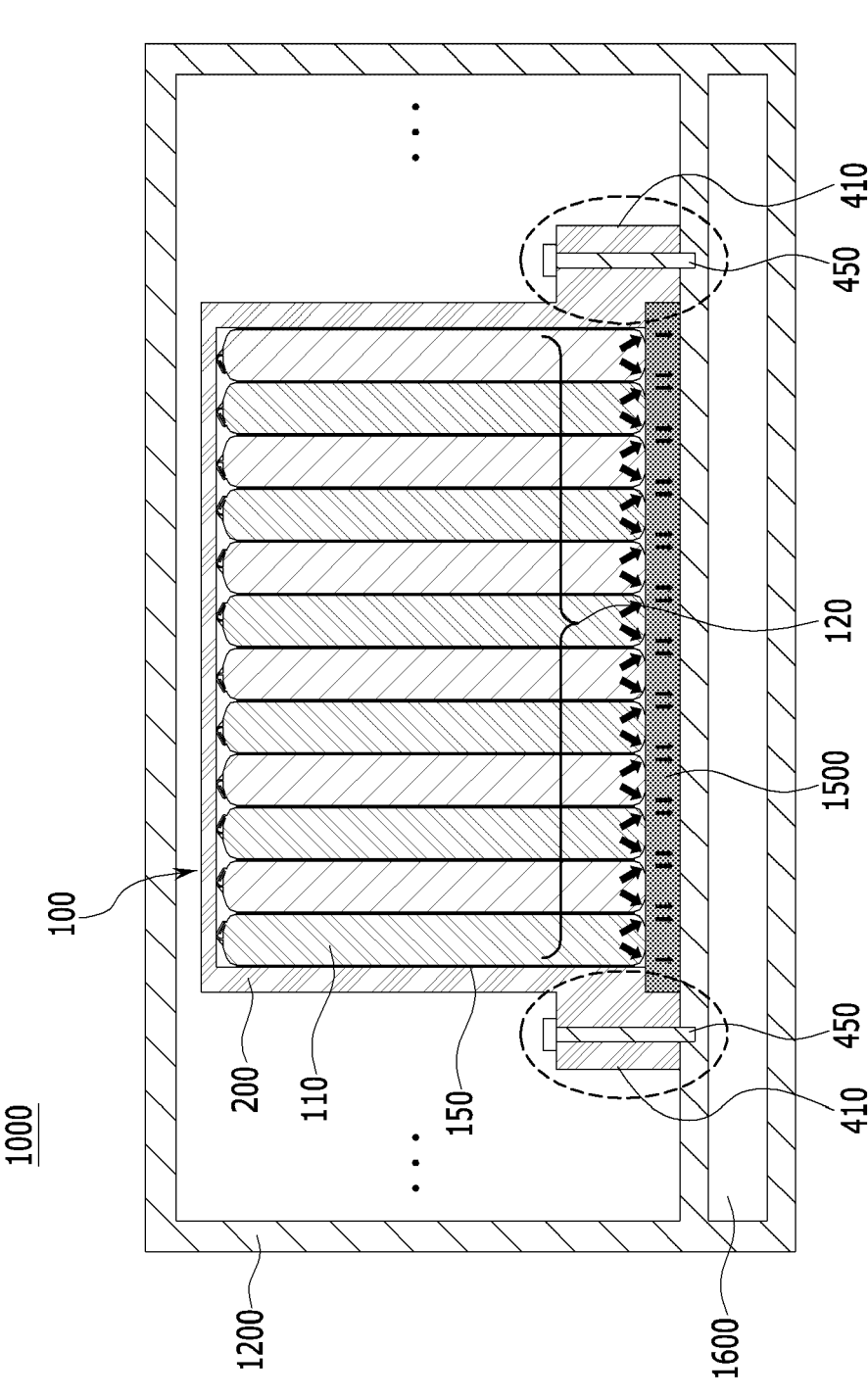

BATTERY PACK AND DEVICE INCLUDING THE SAME

TECHNICAL FIELD

Cross Citation with Related Application(s)

This application claims the benefit of Korean Patent Application No. 10-2020-0167414 filed on Dec. 3, 2020 with the Korean Intellectual Property Office, the disclosure of which is incorporated herein by reference in its entirety.

The present disclosure relates to a battery pack and a device including the same, and more particularly to a battery pack having improved cooling performance and productivity, and a device including the same.

BACKGROUND ART

Along with the increase of the technological development and demand for a mobile device, the demand for batteries as energy sources is rapidly increasing. In particular, a secondary battery has attracted considerable attention as an energy source for power-driven devices, such as an electric bicycle, an electric vehicle, and a hybrid electric vehicle, as well as an energy source for mobile devices, such as a mobile phone, a digital camera, a laptop computer and a wearable device.

Small-sized mobile devices use one or several battery cells for each device, whereas middle or large-sized devices such as vehicles require high power and large capacity. Therefore, a middle or large-sized battery module having a plurality of battery cells electrically connected to one another is used.

The middle or large-sized battery module is preferably manufactured so as to have as small a size and weight as possible. Consequently, a prismatic battery, a pouch-shaped battery or the like, which can be stacked with high integration and has a small weight relative to capacity, is mainly used as a battery cell of the middle or large-sized battery module. Meanwhile, in order to protect the battery cell stack from external impact, heat or vibration, the battery module may include a module frame that is opened in the front and rear surfaces and houses the battery cell stack in an internal space.

FIG. 1 is a perspective view showing a conventional battery module. FIG. 2 is a cross-sectional view taken along the cutting line A-A' of FIG. 1.

Referring to FIGS. 1 and 2, a conventional battery module 10 includes a battery cell stack 12 in which a plurality of battery cells 11 are stacked in one direction, a module frame 20 for housing the battery cell stack 12, end plates 13 for covering the front and rear surfaces of the battery cell stack, and bus bar frames (not shown) formed between the end plate 13 and the front and rear surfaces of the battery cell stack 12.

Here, in the battery module 10, a first heat transfer member 30 is positioned at the lower area of the module frame 20 between the lower part of the battery cell stack 12 and the module frame 20. Thus, heat generated in the battery cell stack 12 can be transferred to the outside of the battery module 10 via the first heat transfer member 30 and the lower part of the module frame 20.

FIG. 3 is a cross-sectional view showing a state in which the battery module of FIG. 1 is coupled to the pack housing.

Referring to FIG. 3, the conventional battery module 10 is coupled to the pack housing and is positioned on a second heat transfer member 50 and a heat sink 60 that are positioned in the lower part of the pack housing. Thus, as heat generated in the battery cell stack 12 is transferred in the order of the first heat transfer member 30, the module frame 20, the second heat transfer member 50 positioned on the lower surface of the lower frame 30, and the heat sink 60, the battery cell stack 12 can be indirectly cooled.

Generally, in the case of the conventional battery module 10, a thermal conductive resin may be used as the first heat transfer member 30 and the second heat transfer member 50. However, since the heat transfer path of the conventional battery module 10 is complicated and thus, the first heat transfer member 30 and the second heat transfer member 50 are required to have high heat conductivity. In this case, the thermal conductive resin can increase heat conductivity by further containing a filler in the form of a metal oxide. However, as the content of the metal oxide increases, it is disadvantageous in terms of cost, and the viscosity of the thermal conductive resin increases, which is disadvantageous even in terms of processability.

Further, in the case of the conventional battery module 10, the module frame 20 is included in the heat conduction path and thus, the module frame 20 is required to have high heat conductivity. In this case, materials applicable to the module frame 20 can be limited, and expensive materials such as aluminum having high heat conductivity are generally used, which is disadvantageous even in terms of cost.

In addition to this, considering that the temperature of the battery cell 11 is one of the factors that limit the output of the battery, there is a need to develop a battery pack having improved productivity while improving cooling performance against heat generated in the battery cell stack 12, and a device including the same.

DETAILED DESCRIPTION OF THE INVENTION

Technical Problem

It is an object of the present disclosure to provide a battery pack having improved cooling performance and productivity, and a device including the same.

The objects of the present disclosure are not limited to the aforementioned objects, and other objects which are not described herein should be clearly understood by those skilled in the art from the following detailed description and the accompanying drawings.

Technical Solution

According to one embodiment of the present disclosure, there is provided a battery pack comprising: a pack housing to which a plurality of battery modules are mounted; a heat transfer member positioned on the pack housing; and a cooling member positioned in the lower part of the pack housing, wherein each battery module of the plurality of battery modules comprises a battery cell stack in which a plurality of battery cells are stacked, and a lower surface of the battery module is opened, and wherein the lower surface of the battery cell stack and the heat transfer member come into direct contact with each other.

Each battery module of the plurality of battery modules comprises a module frame for housing the battery cell stack, and a lower part of the module frame may be opened.

The module frame may be a U-shaped frame including an upper part and side parts.

The side parts of the module frame may be positioned on the heat transfer member.

A mounting part may be formed on at least one side surface of the module frame.

A fixing member is inserted into the mounting part, and the fixing member may be extended from the mounting part to a lower part of the pack housing.

The surfaces of the battery cell stack may be attached to an inside surface of the module frame, respectively.

A first adhesive layer may be positioned between a pair of immediately adjacent battery cells in the battery cell stack.

A second adhesive layer may be positioned between one surface of the battery cell stack and the inside surface of the module frame.

The first adhesive layer and the second adhesive layer may be respectively composed of a tape, or a coating with an adhesive binder.

The heat transfer member may be composed of a heat transfer pad, or a coating with a thermal conductive resin.

The module frame may be composed of a steel material.

The cooling member may be composed of a cooling plate or a heat sink.

According to another embodiment of the present disclosure, there is provided a device comprising the above-mentioned battery pack.

The battery pack may have a groove in a lower edge of an inner surface of the module frame, and the heat transfer member fits within the groove.

Advantageous Effects

According to the embodiments of the present disclosure, the lower part of the module frame included in the battery module is opened, and the lower surface of the battery cell stack of the battery module comes into contact with the heat transfer member of the pack housing, whereby the cooling performance and the productivity can be improved.

The effects of the present disclosure are not limited to the effects mentioned above and additional other effects not described above will be clearly understood from the description of the appended claims by those skilled in the art.

BRIEF DESCRIPTION OF THE DRAWINGS

FIG. 1 is a perspective view showing a conventional battery module;

FIG. 2 is a cross-sectional view taken along the cutting line A-A' of FIG. 1;

FIG. 3 is a cross-sectional view showing a state in which the battery module of FIG. 1 is coupled to the pack housing;

FIG. 4 is a perspective view of a battery module according to an embodiment of the present disclosure;

FIG. 5 is a cross-sectional view taken along the cutting line B-B' of FIG. 4; and FIG. 6 is a cross-sectional view showing a state in which the battery module of FIG. 4 is coupled to the pack housing.

DETAILED DESCRIPTION OF THE EMBODIMENTS

Hereinafter, various embodiments of the present disclosure will be described in detail with reference to the accompanying drawings so that those skilled in the art can easily implement them. The present disclosure may be modified in various different ways, and is not limited to the embodiments set forth herein.

Portions that are irrelevant to the description will be omitted to clearly describe the present disclosure, and like reference numerals designate like elements throughout the specification.

Further, in the drawings, the size and thickness of each element are arbitrarily illustrated for convenience of description, and the present disclosure is not necessarily limited to those illustrated in the drawings. In the drawings, the thickness of layers, regions, etc. are exaggerated for clarity. In the drawings, for convenience of description, the thicknesses of some layers and regions are exaggerated.

Further, throughout the specification, when a portion is referred to as "including" a certain component, it means that the portion can further include other components, without excluding the other components, unless otherwise stated.

Further, throughout the specification, when referred to as "planar", it means when a target portion is viewed from the upper side, and when referred to as "cross-sectional", it means when a target portion is viewed from the side of a cross section cut vertically.

Hereinafter, the battery module according to one embodiment of the present disclosure will be described. However, the description herein is made based on the front surface among the front and rear surfaces of the battery module, without being necessarily limited thereto, and even in the case of the rear surface, a description may be given with same or similar contents.

FIG. 4 is a perspective view of a battery module according to an embodiment of the present disclosure. FIG. 5 is a cross-sectional view taken along the cutting line B-B' of FIG. 4.

Referring to FIGS. 4 and 5, the battery module 100 includes a battery cell stack 120 in which a plurality of battery cells 110 are stacked in one direction, a module frame 200 that houses the battery cell stack 120, end plates 130 that cover the front and rear surfaces of the battery cell stack, and a busbar frame (not shown) formed between of the end plate 130 and the front and rear surfaces of the battery cell stack 120. Here, a busbar electrically connected to the battery cell stack 120 may be positioned on the busbar frame (not shown).

In the battery cell stack 120 housed in the module frame 200, a plurality of battery cells 110 are stacked, wherein the battery cell 110 is preferably a pouch type battery cell. The battery cell 110 can be manufactured by housing the electrode assembly in a pouch case of a laminate sheet containing a resin layer and a metal layer, and then heat-sealing a sealing part of the pouch case. Such a battery cell 110 may be configured by a plurality of numbers, and the plurality of battery cells 110 form a battery cell stack 120 stacked so as to be electrically connected to each other.

Next, the module frame 200 will be described in more detail.

The module frame 200 may be opened in its lower part. In one example, the module frame may be a U-shaped frame including an upper part and a side part, of which the lower surface, the front surface and the rear surface are opened. However, the module frame 200 is not limited thereto, and can be replaced with a frame in which one side part is coupled to the upper part of the L-shaped frame, or the central part of the lower part of the mono frame surrounding the battery cell stack 120 excluding the front and rear surfaces is opened.

Therefore, the lower surface of the battery cell stack 120 housed in the module frame 200 may be exposed to the outside. Further, the lower part of the module frame 200 can be omitted in the heat transfer path of heat generated in the battery cell stack 120, whereby the heat transfer path can be simplified and the cooling performance can also be improved. In addition, the manufacturing unit cost of the module frame 200 can also be reduced, and the productivity can be improved.

Further, the module frame 200 is not included in the heat transfer path of heat generated in the battery cell stack 120, and thus may be composed of a material that does not have high heat conductivity. In one example, the module frame 200 may be composed of at least one of an aluminum alloy material, a fiber-reinforced plastic (FRP) material, and a steel material. Here, when the module frame 200 is composed of a steel material, it may be more advantageous in terms of cost. Moreover, when the module frame 200 is composed of an aluminum alloy material or FRP material, it can be more effectively made light in weight. However, the present disclosure is not limited thereto, and any material capable of protecting the battery cell stack 120 from external impact, moisture penetration, etc. can be applied.

Therefore, the module frame 200 may be composed of a relatively inexpensive material, whereby the manufacturing unit cost of the module frame 200 is also reduced, and the productivity can be improved.

Further, both surfaces of the battery cell stack 120 may be respectively attached to the inside surface of the module frame 200. Here, both surfaces of the battery cell stack 120 may refer to the outside surface of the battery cell 110 positioned at the outermost side. Further, the adhesive layer 150 may be extended along the length and/or width direction from one surface of the battery cell 110. Thereby, even though the lower part of the module frame 200 is opened, the battery cell stack 120 can be stably housed in the module frame 200.

Further, the adhesive layers 150 may be respectively composed of a tape or be formed by coating with an adhesive binder. More preferably, the adhesive layer 150 is coated with an adhesive binder or is composed of a double-sided tape, whereby the battery cell stack 120 and the module frame 200 can be easily fixed. However, the present disclosure is not limited thereto, and any material having adhesive performance capable of fixing between the battery cells 110 or between the battery cells 110 and the side surfaces of the module frame 200 can be applied without limitation.

More specifically, the adhesive layer 150 may be formed on at least a part of both surfaces of the battery cell stack 120. Here, the adhesive layer 150 may include a first adhesive layer and a second adhesive layer. The first adhesive layer may be positioned between a pair of mutually adjacent battery cells 110 in the battery cell stack 120. The second adhesive layer may be positioned between one surface of the battery cell stack 120 and the inside surface of the module frame 200.

Therefore, the battery cell stack 120 can fix the plurality of stacked battery cells 110 to each other and also can be fixed to the inside surface of the module frame 200. That is, even though the lower surface of the battery cell stack 120 is exposed to the outside, the battery cell stack 120 can be more stably fixed to the inside surface of the module frame 200.

The battery pack according to another embodiment of the present disclosure may include the battery module described above, and one or more battery modules can be packaged in a pack case to form a battery pack.

Next, a battery pack according to an embodiment of the present disclosure will be described. However, the description herein will be made based on the cross-section of some battery modules mounted to the battery pack, but is not necessarily limited thereto, and even in the case of other battery modules mounted to the battery pack, a description may be given with same or similar contents.

FIG. 6 is a cross-sectional view showing a state in which the battery module of FIG. 4 is coupled to the pack housing.

Referring to FIG. 6, a battery pack 1000 according to one embodiment of the present disclosure includes a pack housing 1200 to which a plurality of battery modules 100 are mounted; a heat transfer member 1500 positioned on the pack housing 1200; and a cooling member 1600 positioned in the lower part of the pack housing 1200.

The pack housing 1200 may include a lower pack housing in which a plurality of battery modules 100 are mounted, respectively, and an upper pack housing that covers the upper parts of the plurality of battery modules 100.

The heat transfer member 1500 may be positioned on the lower part of the pack housing 1200. Further, the heat transfer member 1500 may be extended along a lower part of the pack housing 1200. Further, the heat transfer member 1500 may be positioned between the lower surface of the battery module 100 mounted to the pack housing 1200 and the lower part of the pack housing 1200. More specifically, the heat transfer member 1500 may be formed in a size corresponding to the lower surface of the battery module 100.

Further, the heat transfer member 1500 positioned on the pack housing 1200 of the battery pack 1000 may come into contact with the lower surface of the battery cell stack 120.

Further, the heat transfer member 1500 may come into contact with both side parts of the module frame 200 together with the lower surface of the battery cell stack 120. In one example, both side parts of the module frame 200 may be positioned on the heat transfer member 1500. Thereby, the heat transferred from the battery cell stack 120 to the module frame 200 may also be transferred back to the heat transfer member 1500.

In one example, the heat transfer member 1500 may be composed of a thermal pad to which thermal conductive powder is added, or may be a thermal conductive resin layer formed by coating a thermal conductive resin. The heat transfer pad is a plate-shaped structure, and may include a silicone resin and a thermal conductive material. The thermal conductive material is not particularly limited, and may include metal powder, graphite, or the like. More preferably, the heat transfer member 1500 is coated with a thermal conductive resin having strong adhesiveness, wherein as the thermal conductive resin of the heat transfer member 1500 is cured, the lower surface of the battery module 100 may be fixed to the heat transfer member 1500 on the pack housing 1200.

Thereby, the heat transfer member 1500 may directly receive the transfer of the heat generated in the battery cell stack 120 in the battery module 100, thereby simplifying the heat transfer path. Further, the heat resistance is lowered, the heat transfer efficiency to the cooling member 1600 is increased, and the cooling performance can be improved.

The cooling member 1600 may be positioned at the lower part of the pack housing 1200. Also, the cooling member 1600 may be extended along a lower part of the pack housing 1200. Further, the cooling member 1600 may come into contact with the heat transfer member 1500 positioned on the lower part of the pack housing 1200.

In one example, the cooling member 1600 may be formed of a cooling plate or a heat sink. Here, the cooling member 1600 may include a cooling flow path. The cooling flow path may include an inflow port and a discharge port that are formed on at least one side surface of the cooling member 1600. Further, in the cooling member 1600, the cooling water is injected into the inflow port and the cooling water may be discharged to the discharge port. That is, it is possible to form a circulation structure in which the refrigerant flowing from the outside of the battery pack 1000 absorbs heat generated from each component inside the battery pack 1000 and then is discharged to the outside of the battery pack 1000 again.

Thereby, the cooling member 1600 can receive the transfer of the heat generated in the battery module 100 through the heat transfer member 1500 and cool it. As the heat transfer path is simplified, the cooling performance can also be further improved.

The battery module 100 according to the present embodiment may have a mounting part 410 formed on at least one side surface of the module frame 200. Also, the mounting unit 410 may be integrated with the module frame 200. A lower part of the mounting part 410 may come into contact with a lower part of the pack housing 1200. Further, the mounting part 410 may be extended toward the lower part of the pack housing 1200 along one side surface of the module frame 200.

Further, the mounting part 410 may include a hole in the central part into which the fixing member 450 can be inserted. Here, the fixing member 450 may be extended from the mounting part 410 to the lower part of the pack housing 1200. In one example, the fixing member 450 may be applied by selecting a member such as a bolt, screw, or nut.

Accordingly, the battery module 100 has the mounting part 410 formed on one side surface of the module frame 200, can sufficiently secure the length of the mounting portion 410 and the fixing member 450, and thus can be stably fixed by the mounting part 410 and the fixing member 450. Also, it can be stably fixed without being separated from the lower part of the pack housing 1200. In addition, due to the fixing force secured by the mounting part 410 and the fixing member 450, the degree of adhesive force required for the heat transfer member 1500 is reduced, and the specification of the thermal conductive resin constituting the heat transfer member 1500 may be relaxed, which may be more advantageous in terms of cost.

The device according to another embodiment of the present disclosure may be applied to the battery module and the battery pack including the same as described above.

The device can be applied to a vehicle means such as an electric bicycle, an electric vehicle, or a hybrid vehicle, but the present disclosure is not limited thereto, and is applicable to various devices capable of using a battery module, which also falls under the scope of the present disclosure.

Although the invention has been shown and described above with reference to the preferred embodiments, the scope of the present disclosure is not limited thereto, and numerous other variations and modifications can be devised by those skilled in the art using the principles of the invention described in the appended claims, which will also fall within the spirit and scope of the present disclosure.

DESCRIPTION OF REFERENCE NUMERALS

100: battery module
110: battery cell
120: battery cell stack
130: end plate
150: adhesive layer
200: module frame
410: mounting part
450: fixing member
1000: battery pack

8

1200: pack housing
1500: heat transfer member
1600: cooling member

The invention claimed is:

1. A battery pack comprising:
a pack housing to which a plurality of battery modules are mounted;
a heat transfer member positioned on the pack housing; and
a cooling member positioned in the lower part of the pack housing,
wherein each battery module of the plurality of battery modules comprises a battery cell stack in which a plurality of battery cells are stacked, and a lower surface of the battery module is opened,
wherein the lower surface of the battery cell stack and the heat transfer member come into direct contact with each other,
wherein each battery module of the plurality of battery modules comprises a module frame for housing the battery cell stack,
wherein the module frame includes a first side part and a second side part, and
wherein the first side part and the second side part are positioned on the heat transfer member.
2. The battery pack according to claim 1, wherein:
lower part of the module frame is opened.
3. The battery pack according to claim 2, wherein:
the heat transfer member comes into contact with the first and second side parts of the module frame together with the lower surface of the battery cell stack.
4. The battery pack according to claim 2, wherein:
the module frame is a U-shaped frame including an upper part and the first and second side parts.
5. The battery pack according to claim 2, wherein:
a mounting part is formed on at least one of the first side surface and the second side surface of the module frame.
6. The battery pack according to claim 5, wherein:
a fixing member is inserted into the mounting part, and
the fixing member is extended from the mounting part to a lower part of the pack housing.
7. The battery pack according to claim 2, wherein:
the surfaces of the battery cell stack are attached to an inside surface of the module frame.
8. The battery pack according to claim 7, wherein:
a first adhesive layer is positioned between a pair of immediately adjacent battery cells in the battery cell stack.
9. The battery pack according to claim 8, wherein:
a second adhesive layer is positioned between one surface of the battery cell stack and the inside surface of the module frame.
10. The battery pack according to claim 9, wherein:
the first adhesive layer and the second adhesive layer are respectively composed of a tape, or a coating with an adhesive binder.
11. The battery pack according to claim 1, wherein:
the heat transfer member is composed of a heat transfer pad, or a coating with a thermal conductive resin.
12. The battery pack according to claim 11, wherein:
the heat transfer member is positioned between a lower surface of the battery module mounted to the pack housing and a lower part of the pack housing.
13. The battery pack according to claim 1, wherein:
the module frame is composed of a steel material.

14. The battery pack according to claim 1, wherein:

the cooling member is composed of a cooling plate or a heat sink.

15. A device comprising the battery pack according to claim 1.

16. The battery pack according to claim 2, further comprising a groove in a lower edge of an inner surface of the module frame, and wherein the heat transfer member fits within the groove.

\* \* \* \* \*